United States Patent [19]

Medvick et al.

[11] Patent Number: 4,685,490
[45] Date of Patent: Aug. 11, 1987

[54] COUPLING

[75] Inventors: Richard J. Medvick, Shaker Heights; Richard C. Weber, Jr., Hudson; Ross L. Wagner, Akron; Edward M. Brand, Cuyahoga Falls, all of Ohio

[73] Assignee: Swagelok Company, Hudson, Ohio

[21] Appl. No.: 829,311

[22] Filed: Feb. 14, 1986

Related U.S. Application Data

[63] Continuation-in-part of Ser. No. 459,150, Jan. 19, 1983.

[51] Int. Cl.[4] .............................................. F16L 55/10
[52] U.S. Cl. .............................. 137/614.03; 277/170; 285/348
[58] Field of Search ................... 137/614.03; 277/170; 285/316, 347, 348

[56] References Cited

U.S. PATENT DOCUMENTS

| | | | |
|---|---|---|---|
| Re. 23,365 | 5/1951 | Stranberg | 284/19 |
| 1,904,061 | 4/1933 | Larson. | |
| 2,016,757 | 10/1935 | Tryon | 308/70 |
| 2,208,286 | 7/1940 | Berger | 137/614.03 |
| 2,254,997 | 9/1941 | Fisher | 137/614.03 |
| 2,304,390 | 12/1942 | Walfram | 137/614.03 |
| 2,311,239 | 2/1943 | Main et al. | 284/19 |
| 2,789,838 | 4/1957 | Palm | 284/19 |
| 2,850,298 | 9/1958 | Clark | 284/19 |
| 2,877,437 | 3/1959 | Flanagan, Jr. | 339/91 |
| 2,948,553 | 8/1960 | Gill et al. | 284/4 |
| 2,951,713 | 9/1960 | Hoffstrom | 284/19 |
| 2,953,399 | 9/1960 | Weaver et al. | 285/374 |
| 3,039,794 | 6/1962 | De Cenzo | 284/19 |
| 3,097,867 | 7/1963 | Saloum | 285/86 |
| 3,104,121 | 9/1963 | Nordin et al. | 285/332.3 |
| 3,159,180 | 12/1964 | Courtot et al. | 137/614.06 |
| 3,173,868 | 3/1965 | Blomquist | 210/445 |
| 3,352,576 | 11/1967 | Thorne-Thomsen | 285/169 |
| 3,359,015 | 12/1967 | Zahuranec | 285/89 |
| 3,382,892 | 5/1968 | Cerbin | 137/614.02 |
| 3,460,801 | 8/1969 | Norton | 251/149.6 |
| 3,475,001 | 10/1969 | Hieber | 251/149.8 |
| 3,777,782 | 12/1973 | Shendure | 137/614.02 |
| 3,847,393 | 11/1974 | Busselmeier | 285/315 |
| 4,086,939 | 5/1978 | Wilcox et al. | 137/614.03 |
| 4,114,853 | 9/1978 | Medvick | 251/149.6 |
| 4,138,144 | 2/1979 | Pierce, Jr. | 285/18 |
| 4,269,389 | 5/1981 | Ekman | 251/149.6 |
| 4,442,863 | 4/1984 | Magorien | 137/614.03 |

FOREIGN PATENT DOCUMENTS

| | | |
|---|---|---|
| 659124 | 10/1937 | Canada. |
| 2653976 | 12/1940 | Fed. Rep. of Germany. |
| 827785 | 9/1941 | France. |
| 1015631 | 8/1952 | France ........................ 137/614.03 |
| 434905 | 12/1941 | Switzerland. |
| 1203227 | 11/1939 | United Kingdom. |

Primary Examiner—A. Michael Chambers
Assistant Examiner—John C. Fox
Attorney, Agent, or Firm—Fay, Sharpe, Beall, Fagan, Minnich & McKee

[57] ABSTRACT

A quick connect/disconnect coupling for carrying fluid under pressure includes a latch mechanism requiring two independent movements in two different directions for releasing same. The coupling includes improved seals at various locations along with a slide bearing, and improved support fins for internal valves. The coupling is keyed in a plurality of different mating pairs of body and stem assemblies so that the stem assemblies having different keys cannot be mated together.

15 Claims, 33 Drawing Figures

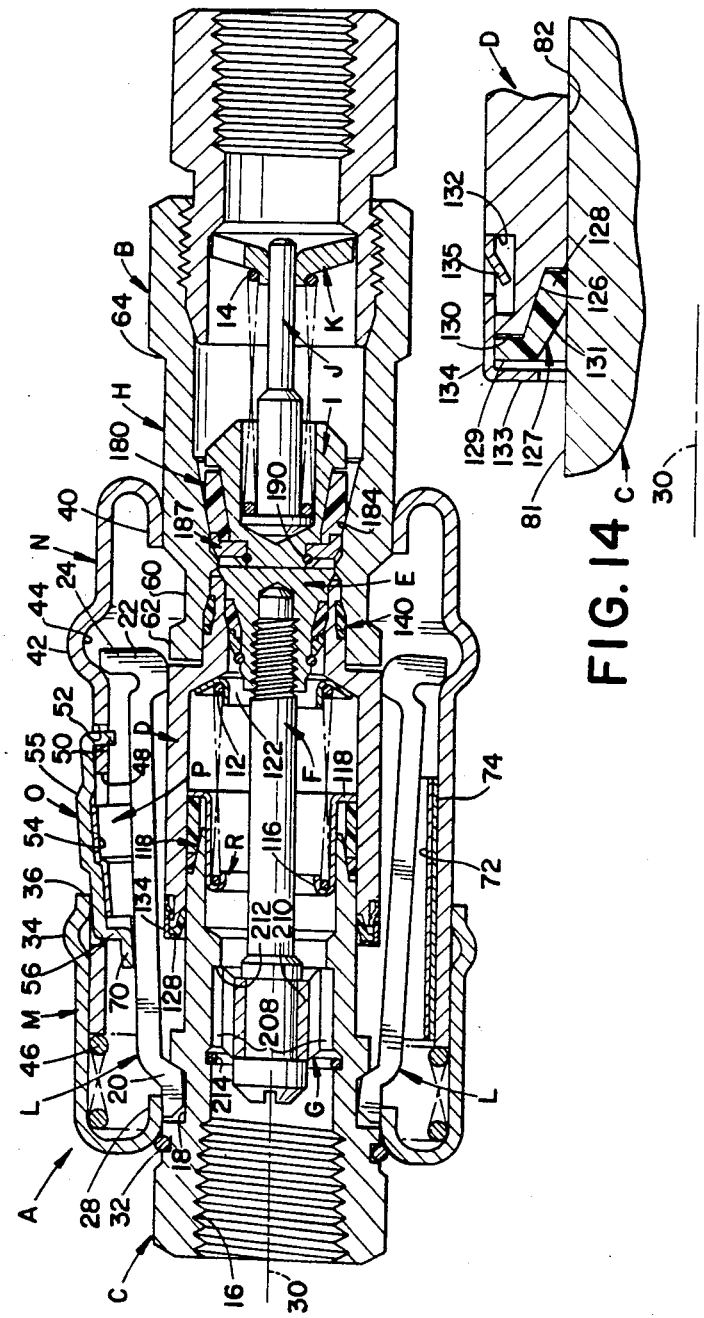
FIG. 1
FIG. 14

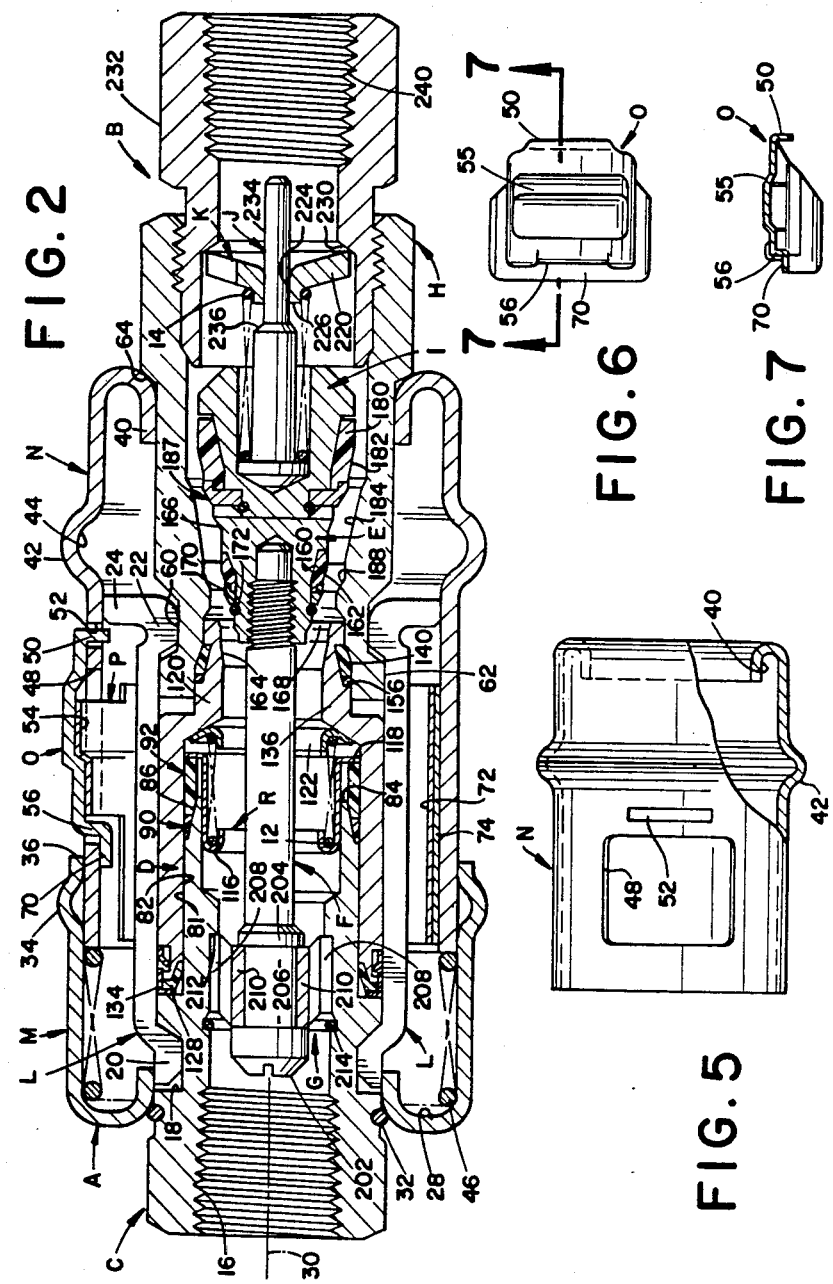

| KEY NO. | STEM DIA. S | BODY DIA. T | STEM DIA. U | BODY DIA. V |
|---|---|---|---|---|
| STANDARD | 1.240 | 1.250 | .720 | .710 |
| K1 | 1.300 | 1.310 | .740 | .730 |
| K2 | 1.330 | 1.340 | .760 | .750 |
| K3 | 1.360 | 1.370 | .780 | .770 |
| K4 | 1.390 | 1.400 | .810 | .800 |

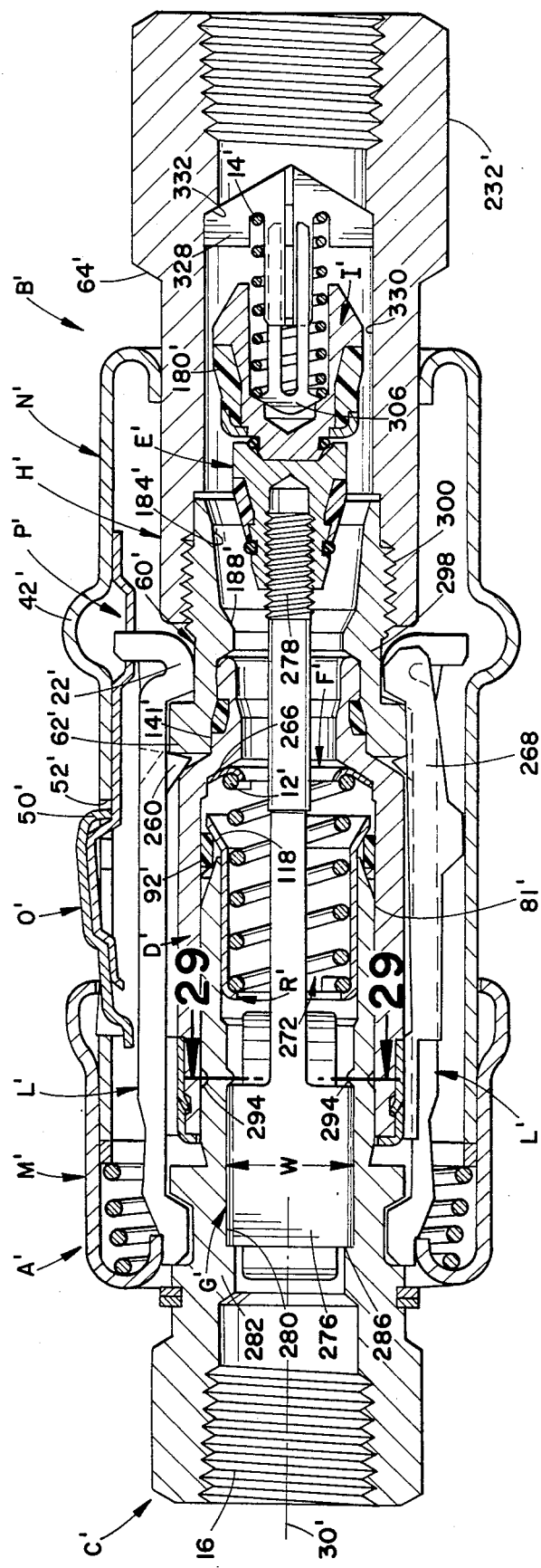
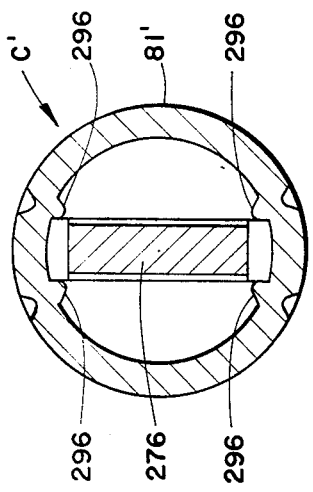
FIG. 23
FIG. 29

COUPLING

This application is a continuation-in-part of application Ser. No. 459,150, filed Jan. 19, 1983 for "Coupling".

BACKGROUND OF THE INVENTION

This application relates to the art of couplings and, more particularly, to quick connect/disconnect couplings. Although the invention is particularly applicable to couplings of the type described and will be explained with particular reference thereto, it will be appreciated that certain features of the invention have broader aspects and may be used with other fittings or fluid containing devices such as control valves, check valves, unions, pipe or tube connectors, or the like.

Conventional quick connect/disconnect couplings have latch mechanisms which are so easy to release that accidental or unintentional release may occur. It has been found desirable to construct a latch mechanism which requires a conscious effort to release and is protected against accidental release.

Conventional couplings of the type described are also subject to slight leakage when they are uncoupled or to entrainment of air when they are coupled. Likewise, the various seals and packings are subject to blowout and leakage. It would be desirable, therefore, to provide a coupling with improved seals and packings, and which would be arranged for minimizing any leakage or air entrainment when the coupling is connected and disconnected.

SUMMARY OF THE INVENTION

A quick connect/disconnect coupling including latch means for releasably latching together body and stem couplings members or assemblies. The latch means includes operating means in the form of an operating sleeve movable between latch holding and latch releasing positions. Stop means carried by the operating sleeve cooperates with abutment means for blocking movement of the operating sleeve to its releasing position until the stop means itself is moved to an unblocking position clear of the abutment means. In one arrangement, the stop means takes the form of a small button movable transversely of the longitudinal axis of the coupling. Thus, the button must be held in for clearing the abutment while the operating sleeve simultaneously moves longitudinally to its latch releasing position. The abutment means may take the form of an abutment sleeve within which the operating sleeve is closely received, and a spring acting between the abutment and operating sleeves normally biases the operating sleeve to its latch holding position.

The latch members comprise metal stampings having first end portions attached to the body assembly for swinging movement of the opposite end portions toward and away from the coupling longitudinal axis. The other end portions of the latches have inwardly extending latch hooks and outwardly extending projections. The latch hooks are receivable in a circumferential groove in the stem assembly for latching the stem assembly to the body assembly. In the latched position of the latch members, the latch projections bear against the inner surface of the operating sleeve. Upon movement of the operating sleeve to the latch releasing position, the latch projections are cammed outwardly into a recess in the operating sleeve formed by an outwardly extending circumferential bead. This recess has a cam surface which also cooperates with the latch projections for camming same back to a latched position when a coupling is again connected. The abutment sleeve also has an outwardly extending circumferential bead and the button is located between the beads for protecting same against accidental operation. Further, the abutment and operating sleeves have outer end portions which are reversely curved inwardly for stiffening purposes.

The body coupling member or assembly includes a body part having a slide part longitudinally slidable thereon. The body and slide parts respectively have closely facing outer and inner cooperating cylindrical surfaces. The body part has an inner end spaced radially inward from the inner surface of the slide part and a taper surface extends from such body part end to the outer surface thereon. The taper surface includes a slow taper surface extending from the body part inner end toward the outer surface thereof and merging into a fast taper surface adjacent the intersection thereof with the body part outer surface. The taper surface on the body part is spaced from the inner surface of the slide to define a receiving space for a packing, and the fast taper surface is disposed adjacent the apex of such receiving space. A backup ring is disposed in the receiving space adjacent the apex thereof and a packing ring is also located in the receiving space outwardly of the backup ring. Biasing means normally biases the packing ring and backup ring further into the packing receiving space. Both the backup ring and the packing ring are of a deformable material, with the backup ring being harder and less deformable than the packing ring.

In one arrangement, a cup-like packing gland is closely received within the body part, and has an inwardly extending flange inside of the body part and an outwardly extending flange outside of the body part. The outwardly extending flange engages the packing and the biasing means in the form of a coil spring acts between the slide and the inner flange of the gland. Such arrangement causes the slide to normally be biased in a direction off of the body part while simultaneously biasing the packing into the packing receiving space.

The slide is movable longitudinally in one direction further onto the body when a coupling is being connected and is movable longitudinally in an opposite direction off of the body when a coupling is being disconnected. During connection of a coupling, transverse forces tend to cause the slide to interfere with the body and inhibit movement of the slide in the one direction. Therefore, the outer terminal end portion of the slide includes an inner circumferential bearing recess and an outer circumferential retainer groove. The recess includes a recess slow taper surface which opposes the outer cylindrical surface of the body part and the slope is outwardly away from the body part longitudinal axis when proceeding longitudinally in the one direction which is also away from the body valve. A bearing ring has a generally L-shaped cross-sectional shape including a generally axial leg received in the bearing recess and a generally radial leg extending outwardly at the outer terminal end of the slide. The outer surface of the bearing ring axial leg generally corresponds with the slope of the recess slow taper surface. A bearing ring retainer includes an axial cylindrical portion having inwardly extending detents loosely received in the retainer groove and an inwardly extending retainer flange overlying the radial leg of the bearing ring outwardly thereof. Relatively loose reception of the bearing retainer detents in the retainer groove allows limited axial movement of the retainer ring and this also allows some axial movement of the bearing ring. The internal diameter of the axial leg on the bearing ring is preferably slightly smaller than the external diameter of the body part. During movement of the slide in the one direction, the axial leg of the bearing ring is forced into the slide recess, and cooperation between the inner slow taper surface on the slide recess and corresponding outer taper surface on the axial leg of the bearing ring cause the axial leg to contract generally radially into firm bearing engagement with the outer surface of the body part. Thus, the slide rides on a bearing ring having a very low coefficient of friction instead of riding directly on the outer surface of the body part when the coupling assemblies are being connected. During movement of the slide in an opposite direction while uncoupling the parts, the bearing ring is not cammed radially inwardly into engagement with the outer surface of the body part for providing free separation when transverse forces are minimal.

The body assembly includes an internal body valve having a seal engagable by a valve seat on the slide for closing the slide and body against fluid flow therethrough. The body valve seal has sloping or tapered surface areas on both the internal and external surfaces thereof for creating a mechanical advantage which increases the compressive stress on high points or irregularities. One end and a peripheral end portion of the body valve seal is surrounded by a metal retainer for resisting blowout of the seal. On the opposite side of the seal from the metal retainer, a positive metal stop surface is provided for engagement with a cooperating surface on the slide. The cooperating stop surfaces prevent extrusion of the seal.

The body valve is essentially supported within the body by an elongated member and the elongated member is, in turn, centrally held within the body by fins. Fluid flow must take place past the fins around the elongated member. Thus, it is desirable to have such fins be as thin as possible while having sufficient strength to resist longitudinal shearing and compressive forces. In accordance with the present invention, the fins are in the form of a pair of fin members each having a generally M-shaped configuration in an end view. Each fin member includes outer legs connected by a somewhat U-shaped portion having a central curved portion. The central curved portion is spaced from the terminal ends of the outer legs and is curved outwardly away therefrom. A pair of fin members are reversely positioned with the outer leg ends engaging one another and with the curved portions facing one another on the periphery of a common circle. A section of the body valve elongated member is located between the curved portions of the fins.

The stem assembly includes a stem member having a poppet movable therein between closed and open positions. The poppet has an external circumferential seal with sloping or tapered surfaces on both the external and internal periphery thereof. The poppet seal is engageable with a seat on the stem member. One end of the poppet and a peripheral end portion of the poppet seal are surrounded by a metal retainer for preventing blowout of the poppet seal. One side of the metal retainer serves as a positive metal stop for cooperation with a corresponding stop on the stem member to prevent extrusion of the poppet seal.

The poppet includes a poppet shaft extending axially rearward therefrom to a central opening in a guide member. This guide member includes a plurality of circumferentially-spaced spokes extending outwardly from a central portion having the poppet shaft receiving opening therethrough and having an axially extending circular boss. A coil spring has one end closely received over the circular boss on the guide member and the opposite end engaging the poppet for normally biasing the poppet to its closed position.

When a body and stem assembly are connected, the stem member moves beneath the operating sleeve into engagement with the slide for longitudinally moving same away from the body valve. Longitudinal movement of the body and stem assemblies toward one another also causes the body valve to enter one end of the stem member and engage the poppet for moving same to its open position. Once the latch hooks are received in the external circumferential groove formed in the stem member, the components are connected together.

A plurality of pairs of keyed body and stem assemblies are arranged so that body assemblies and stem assemblies having different keys cannot be connected with one another. This is accomplished by varying the internal diameter of the operating sleeve, the external diameter of the stem member, the external diameter of the body valve, and the internal diameter of the open stem member end. Assemblies having different keys will not mate due to interference either between a stem member and operating sleeve or between a body valve and an open end of a stem member.

The principal advantage of the present invention is the provision of an improved quick connect/disconnect coupling.

Another advantage of the invention is the provision of a quick connect/disconnect coupling having an improved latch mechanism.

Another advantage of the invention is the provision of a quick connect/disconnect coupling having a latch mechanism which requires movements in two different directions for obtaining a released condition.

An additional advantage of the present invention resides in providing an improved fluid coupling having improved seals.

Still another advantage of the invention is found in the provision of a coupling having an improved bearing arrangement between a body and a longitudinally movable slide.

A further advantage of the invention resides in an improved arrangement for biasing a packing into a packing receiving space.

Still a further advantage of the present invention is found in improved arrangements for supporting a body valve and a stem poppet respectively within a body assembly and a stem assembly.

Yet another advantage of the invention is in providing an improved keying arrangement for insuring that only mating pairs of body and stem assemblies can be cooperatively joined.

Still other advantages of the present invention will become apparent to those skilled in the art upon a reading and understanding of the following detailed description.

BRIEF DESCRIPTION OF THE DRAWINGS

The invention may take form in certain parts and arrangements of parts, a preferred embodiment of which will be described in detail in the specification and illustrated in the accompanying drawings which form a part hereof and wherein:

FIG. 1 is a side cross-sectional elevational view showing the coupling of the present invention about to be connected or just after it has been disconnected;

FIG. 2 is a view similar to FIG. 1 showing the coupling in its connected configuration;

FIG. 5 is a top plan view of an operating sleeve used in the latch mechanism;

FIG. 6 is a top plan view of a stop button;

FIG. 7 is a cross-sectional view taken generally along lines 7—7 of FIG. 6;

FIG. 14 is an enlarged, partial cross-sectional elevational view showing a slide bearing between the valve body part and the slide;

FIG. 23 is a cross-sectional view similar to FIG. 2 showing a modified form of the invention with the body and stem coupling assemblies in their connected relationship;

FIG. 29 is a partial cross-sectional view taken on line 29—29 of FIG. 23;

DESCRIPTION OF A PREFERRED EMBODIMENT

Figure 3:
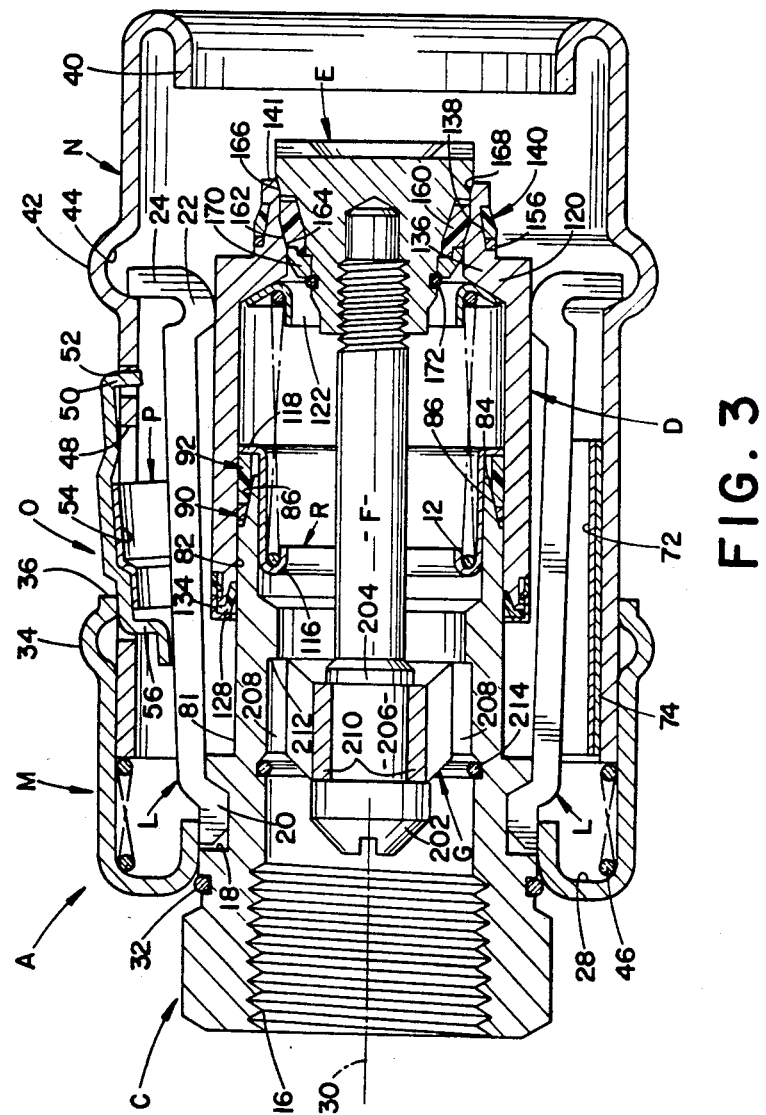
FIG. 3 is a cross-sectional side elevational view of the body assembly only of FIGS. 1 and 2.

Referring now to the drawings wherein the showings are for purposes of illustrating preferred embodiments of the invention only and not for purposes of limiting same, FIG. 1 shows a mating pair of body and stem coupling members or assemblies A and B, respectively, in a position about to be connected upon movement axially toward one another.

Body assembly A includes a body part or member C having a slide part D axially slidable thereon. Slide part D is normally biased to the right in FIG. 1 into engagement with a body valve E by means of a coil spring 12. Body valve E is attached to an elongated member or bolt F and held centrally within the body part C by support fins G.

Stem assembly B includes a stem part or member H having a poppet I disposed therein. Poppet I is normally biased to the left in FIG. 1 into engagement with a seat adjacent an open end of the stem by means of a coil spring 14. Spring 14 surrounds a guide shaft or bolt J extending through an opening in a guide member K against which spring 14 also acts.

When a mated pair of body and stem assemblies A,B are to be coupled, they are positioned as shown in FIG. 1. It will be noted that the outer end portion of stem member H engages the outer end portion of slide part D and, upon movement of assemblies A,B toward one another, slide part D retracts to the left in FIG. 1 out of engagement with body valve E. At the same time, body valve E enters the open end of stem member H and engages poppet I to move same away from its seat, i.e., to the right in FIG. 1. Once the assemblies are connected, the parts are arranged as generally shown in FIG. 2 and fluid flow can take place through the connected assemblies.

Body part C is internally threaded as generally indicated at 16 for connection to another fluid conduit. Other interconnecting means could also be advantageously employed, however. An external circumferential groove 18 in the body part C loosely receives inwardly extending first end portions 20 of a plurality of latch members L. These latch members preferably comprise metal stampings, and have an arcuate conformation in an end view. The opposite end portions of latch members L include inwardly extending latch hooks 22 and outwardly extending latch projections 24.

A generally cylindrical abutment sleeve M is positioned over body part C and has an outer end portion reversely curved inwardly as generally indicated at 28. Reversely curved end portion 28 has an axially extending portion overlying axially extending portions of first end portions 20 of latch members L to loosely hold same within groove 18 for allowing swinging movement of the latch members opposite end portions toward and away from coupling longitudinal axis 30. A snap ring 32 received in a suitable external circumferential groove in body part C retains abutment sleeve M in position. Abutment sleeve M includes an outwardly extending circumferential bead 34 for stiffening same against a deformation, and also includes a terminal end 36.

Operating means in the form of a generally cylindrical sleeve N surrounds latch members L and has an outer end portion reversely curved inwardly as generally indicated at 40. An outwardly extending circumferential bead 42 provides an inner circumferential recess 44 having a gradual slope to provide a cam surface for cooperation with latch projections 24. In the outward released position of latch members L as shown in FIG. 1, latch projections 24 are received in recess of 44. This relationship also acts to retain operating sleeve N against complete displacement to the right from body assembly A. A coil spring 46 is positioned between the reversely curved outer end portion of abutment sleeve M and the inner terminal end of operating sleeve N for normally biasing operating sleeve N away from abutment sleeve M.

A generally rectangular opening 48 in operating sleeve N receives stop means in the form of stop button O having a downwardly depending leg 50 freely received through a slot 52 spaced slightly from rectangular opening 48. A generally circular leaf spring P has an upper flat projection 54 received in the recessed underside of button O and normally biases the stop button upwardly in the view of FIG. 1. Stop button O has a leading edge 55 with a slow slope to prevent accidental cocking of the button when contacted by an external object having relative movement generally toward abutment sleeve M. Stop button O also has an inner end 56 engageable with abutment sleeve inner end 36 to prevent further movement of operating sleeve N within abutment sleeve M to the left in FIG. 1 until stop button O is depressed for allowing button inner end 56 to pass beneath end 36 of the abutment sleeve. The inner end portion of operating sleeve N is closely received and guided within abutment sleeve M.

Stem assembly B includes cooperating coupling means on stem member H in the form of a circumferential groove 60 for receiving latch hooks 22. With the components positioned as shown in FIG. 1, movement of body part C and stem member H toward one another causes slide D to retract to the left. At the same time, latch hooks 22 ride along the outer surface of slide D and an outer surface portion 62 of stem member H until latch hooks 22 reach groove 60. At this point, latch members L swing inwardly for reception of latch hooks 22 within groove 60. Spring 46 disposed between abutment sleeve M and operating sleeve N, biases operating sleeve N to the right in FIG. 1. This causes the cam surface portion of recess 44 to cooperate with latch projections 24 for urging latch hooks 22 into groove 60. This also releases operating sleeve N for movement to the right from the latch releasing position of FIG. 1 to the latch holding position of FIG. 2. In the latch holding position, the outer ends of latch projections 24 engage the inner cylindrical surface of operating sleeve N at a location spaced from recess 44 on the opposite side thereof from reversely curved outer end portion 40. Also, the outer end of reversely curved end portion 40 engages an abutment 64 on stem member H for holding operating sleeve N against further movement to the right in FIG. 2. When latch hooks 22 are received in a latching condition in groove 60, the latch members are positioned substantially 360° around the groove. This relationship enhances the connected relationship between body and stem coupling members A,B.

With the components connected as shown in FIG. 2, such connection requires movement of operating sleeve N to the left until latch projections 24 are generally aligned with recess 44. However, axial movement of operating sleeve N to the left in FIG. 2 is prevented because terminal end 56 of stop button O engages terminal end 36 of the abutment means defined by abutment sleeve M. In order to free operating sleeve N for movement to its releasing position, it is necessary to depress stop button O and hold depressed while operating sleeve N is urged axially to the left so that stop button terminal end 56 will pass beneath abutment terminal end 36 as shown in FIG. 1. Thus, the latch means requires independent movements in two different directions for moving same to a releasing position. The movement of button O is generally toward and away from coupling longitudinal axis 30 with the motion being generally pivotal about button projection 50 in slot 52. Once recess 44 is generally aligned with latch projections 24, the biasing action of spring 12 urging slide D to the right is also urging stem member H to the right. The cooperating cam surfaces between latch hooks 22 and groove 60 cause the end portions of latch members L to be cammed generally radially outward for reception of latch projections 24 in recess 44.

It will be noted that stop button O is located between outwardly extending circumferential beads 34,42. Preferably, the button does not project above a plane tangent to the outer surfaces of both beads 34 and 42. Thus, button O is protected by the beads against accidental movement to its unblocking position from its normal blocking position where movement of operating sleeve N to its latch releasing position is prevented. Outwardly extending circumferential bead 42 on operating sleeve N also performs the function of providing an abutment against which a person's thumb and fingers may act to move operating sleeve N to the left against the biasing force of spring 46.

FIG. 5 simply shows the rectangular opening 48 and slot 52 in operating sleeve N with more particularity.

FIGS. 6 and 7 show the stop means defined by stop button O. It will be recognized that stop button O is transversely curved to the general curvature of operating sleeve N. The underside of stop button O is recessed. An outwardly extending flange 70 extends outwardly from the button underside along abutment end 56 thereof and partly along the opposite sides thereof toward projection 50. The flanges along the sides of button O terminate sufficiently short of the end having downwardly extending projection 50 for allowing the button to be positioned within and without operating sleeve N. When in the uncocked blocking position as shown in FIG. 2 to block movement of operating sleeve N into abutment sleeve M, flange 70 abuts and approximately conforms to the inner contour of operating sleeve N partially around the rectangular opening 48 while projection 50 extends downwardly through slot 52. To move to the cocked position shown in FIG. 1 to allow terminal end 56 to partially enter abutment sleeve M, the button pivots on the portion of operating sleeve N between rectangular opening 48 and slot 52. Terminal end 56 is within a plane either perpendicular to axis 30 or sloping from the outer periphery of button O in a direction both radially inward and axially outward from terminal end 36 of abutment sleeve M. This is to prevent a camming force which would work to depress and cock the button when sleeve N is moved into sleeve M.

Figure 8:
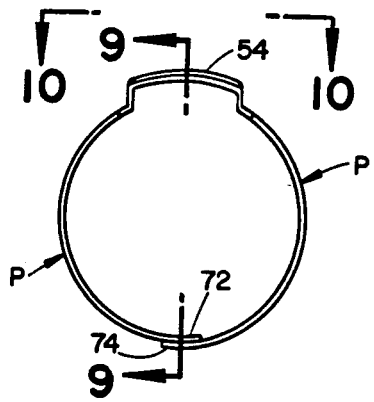
FIG. 8 is an end view of a spring used in association with the stop button of FIGS. 6 and 7.
Figure 9:
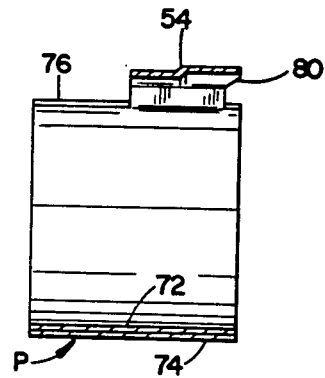
FIG. 9 is a cross-sectional view taken generally along lines 9—9 of FIG. 8.
Figure 10:
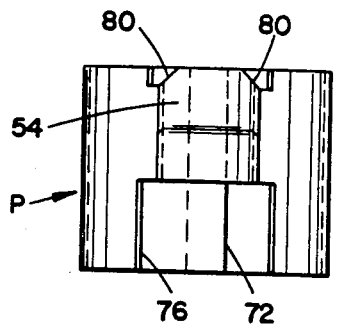
FIG. 10 is a top plan view taken generally on-line 10—10 of FIG. 8.

As shown in FIGS. 8-10, button spring P comprises a generally flat leaf spring curved into a generally circular conformation having freely overlapping terminal end portions 72,74 for allowing spring contraction and expansion. The top portion of the spring opposite from the overlapping ends has a generally rectangular cutout 76 therein and an upwardly raised projection 54. The outer corners or projection 54 are relieved as generally indicated at 80 to generally correspond with the curved corners of button O adjacent projection 50. Spring projection 54 is curved to the general transverse contour of stop button O and is sized for reception in the recessed underside of the button. Thus, spring P holds stop button O in a position normally projecting upwardly through rectangular opening 48 with a button flange 70 engaging the inner surface of operating sleeve N. Depressing stop button O may cause spring P to contract by further overlapping movement of terminal end portions 72,74 and by deformation of spring projection 54.

Figure 11:
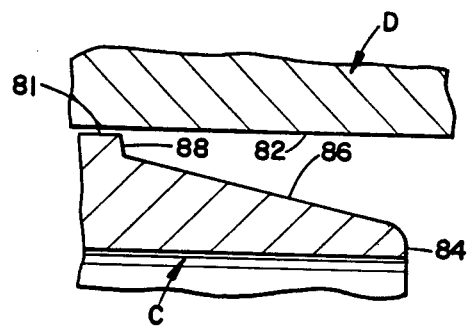
FIG. 11 is an enlarged partial side elevational view in cross-section showing a packing receiving space.

Inner body part C and outer slide part D include closely facing cooperating outer and inner cylindrical surfaces 81,82, respectively (FIG. 2). Body part C has an inner terminal end 84 spaced radially inward from outer surface 81 thereof. A taper surface extends from inner terminal end 84 to inner surface 81. As best shown in FIG. 11, this taper surface includes a slow taper surface 86 inclined to coupling longitudinal axis 30 at a small angle and merging into a fast taper surface 88 adjacent the intersection thereof with outer surface 81. In general, slow taper surface 86 is more parallel to axis 30 than perpendicular thereto, while fast taper surface 88 is more perpendicular to axis 30 than parallel thereto. The taper surface cooperates with a portion of inner surface 82 on slide D to define a packing receiving space and fast taper surface 88 is located adjacent the apex of this space.

Figure 13:
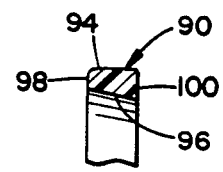
FIG. 13 shows the axial cross-sectional conformation of a backup ring.

A backup ring 90 and a packing ring 92 are positioned in the packing receiving space with backup ring 90 being located adjacent fast taper surface 88. FIG. 13 shows a backup ring 90 having a cylindrical outer surface 94 generally corresponding to inner cylindrical surface 82 of slide D and an inner surface 96 inclined at substantially the same taper as slow taper surface 86. Backup ring 90 includes opposite parallel ends 98, 100 extending perpendicular to outer surface 94, with outer surface 94 merging into end surfaces 98, 100 with smoothly curved convex corners. All of the seals and packings used in the preferred embodiment here under discussion are preferably constructed of virgin polytetrafluoroethlyene ("TFE"). Backup ring 90 preferably comprises polyphenylene sulfide (PPS) filled TFE or some other fairly hard yet pliable material so as to render the backup ring expandable yet relatively non-deformable compared to packing ring 92. Both TFE and PPS provide excellent compatibility with an extremely wide range of chemicals. Seals and backup rings of these materials have been found to be longer lasting and more resistant to failure than conventional rubber or other elastomeric seals. However, it will be appreciated that other materials also could be employed satisfactorily to accommodate various environments or coupling applications.

Figure 12:
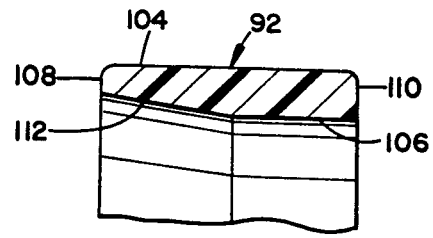
FIG. 12 shows the axial cross-sectional conformation of a packing ring.

As shown in FIG. 12, packing ring 92 has a generally cylindrical outer surface 104 and an inner cylindrical inner surface portion 106. Parallel opposite ends 108,110 extend perpendicular to outer and inner surfaces 104,106. Approximately one-half of the axial width of inner surface 106 has a taper surface 112 thereon for cooperation with slow taper surface 86. The slow taper provides a mechanical advantage which allows packing ring 92 to deform and conform to irregularities on the surfaces of the various components. This mechanical advantage and resulting deformation enables TFE, which is a relatively hard sealing material, to provide a gas tight seal while subjected to relatively low packing loads. The thickness and axial width of packing ring 92 are also such that packing ring end 110 is spaced axially a substantial distance outwardly beyond body part end 84.

With particular reference to FIG. 3, a generally cylindrical cup-like packing gland R is closely slidably received within hollow body part C. Gland R has an axially inward extending reversely curved flange 116 inside of body part C and a radially outward extending flange 118 disposed axially outward from inner terminal end 84 thereof for engaging terminal end 110 (FIG. 12) of packing ring 92.

Slide D has an inner inwardly extending portion 120 against which a spring eyelet 122 is positioned. The biasing means defined by coil spring 12 has one end received over eyelet 122 and the opposite end bearing against inwardly extending reversely curved flange 116. The reverse curve of flange 116 beneath the end coil of spring 12 combines with the alignment function of spring eyelet 122 to contain spring 12 against unseating forces from moving fluids. Spring 12 defines a slide biasing means for normally biasing slide D in one direction off or away from body part C, and also defines a packing biasing means for urging packing 92 and backup ring 90 to the left in FIGS. 1 and 2 tightly into the packing receiving space.

When the coupling is internally pressurized, the pressure force acts on packing ring 92 to force such packing and backup ring 90 further into the packing receiving space. The taper surface 86 imparts radially outward motion to the packing ring for causing such ring to be pressed firmly into the inner surface of the slide. The slow taper surface 86 provides a mechanical advantage which amplifies the compressive stresses on high points and irregularities in the packing at points where they contact the slide or body. Backup ring 90 prevents extrusion of the packing ring into the interface between the outer surface 81 of the body and the inner surface 82 of the slide. Axial movement of the packing ring causes it to contact the backup ring and forces same to move axially. The slow taper surface 86 causes the axially moving backup ring to move radially outward to firmly engage the inner surface 82 of the slide for preventing the packing from extruding past the backup ring. The fast taper surface 88 reduces the tendency for axial movement of the backup ring. This combines with the less deformable or harder material composition of the backup ring to minimize the tendency of the backup ring to extrude between the body and slide.

As shown in FIG. 14, the outer end portion of slide D has an internal circumferential recess with a sloping wall 126 in outwardly spaced opposing relationship to body part outer surface 81. Recess sloping wall 126 slopes outwardly away from axis 30 at a slow taper when proceeding from right-to-left in FIG. 14, and this is also the one direction in which slide D moves when the two body and stem coupling assemblies A,B are being connected. A TFE bearing ring 127 has a generally L-shaped cross-sectional configuration including a larger axial leg 128 received in the internal slide recess and a radial leg 129 extending outwardly along slide terminal end 130. Axial leg 128 has a generally cylindrical inner surface with a diameter slightly less than the external diameter of external cylindrical surface 81 on body part C. Axial leg 128 has an external surface with a slow taper generally corresponding to the taper on recess sloping surface 126. A cam surface 131 connects the outer surface of radial leg 129 with the inner surface of axial leg 128, and aids initial assembly as well as wiping action during connection of the coupling assemblies. Slide D has an external circumferential groove 132 spaced a short distance axially from terminal end 130 thereof and is of generally rectangular cross-sectional shape. Retaining means for preventing complete displacement of the bearing ring from the recess while allowing limited axial movement thereof relative to the slide comprises a metal retainer ring including an inwardly extending flange 133 overlying bearing ring radial leg 129. The axial spacing between flange 133 and slide terminal end 130 is substantially greater than the axial thickness of bearing ring radial leg 129. A retainer ring cylindrical portion 134 is closely received over that portion of slide D extending between terminal end 130 and groove 132, and which portion has an external diameter smaller than the remainder of slide D by approximately two times the radial thickness of retainer ring cylindrical portion 134. A plurality of circumferentially-spaced inwardly extending barbs or detents 135 are punched and bent from cylindrical portion 134 and slope inwardly toward axis 30 at a slow taper from right-to-left in FIG. 14. The axial distance between the terminal end of cylindrical portion 134 and the terminal end of detents 135 is substantially less than the axial width of groove 132. In other words, there is a loose fit so that the retainer ring can move back-and-forth axially. When the retainer ring is being assembled, detents 135 will bend outwardly until they snap back into groove 132. Engagement between the terminal end of cylindrical portion 134 and one side of groove 132, and between the terminal ends of detents 135 and the opposite side of groove 132, define the limits of axial movement for the retainer ring. During movement of slide D in the one direction to connect the coupling, which is movement of slide D from right-to-left in FIG. 14, cooperation between the tapering surfaces of the slide recess and the bearing ring axial leg causes axial leg 128 to contract generally radially into firm engagement with body part external surface 81. Thus, during connecting movement, slide D rides on bearing ring 127 having a very low coefficient of friction instead of riding on another metal surface. This is significant in that substantially all of the major coupling components are preferably of stainless steel and galling is a particular problem associated with such material. The firm engagement of bearing ring axial leg 128 with external surface 81 of body part C also performs a thorough wiping action. When slide D is thereafter moved in the opposite direction, i.e., to the right or uncoupling direction in FIG. 14, bearing ring 127 is free for limited movement to the left so it does not compressively engage body part C with great force and allows free separation of the parts when lateral forces are minimal.

Figure 4:
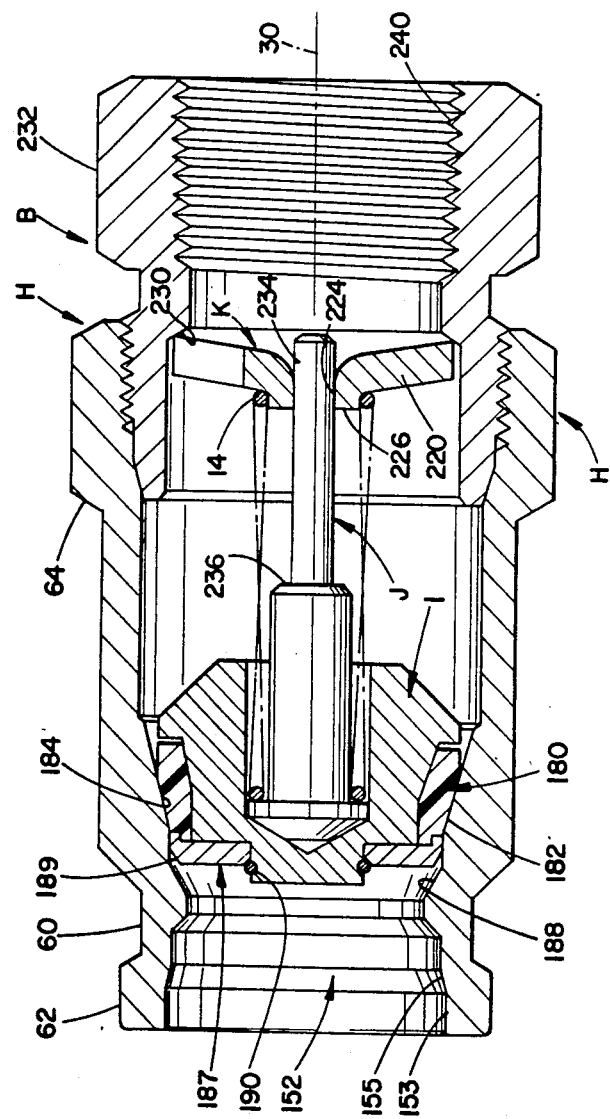
FIG. 4 is a cross-sectional side elevational view of the stem assembly only of FIGS. 1 and 2.
Figure 15:
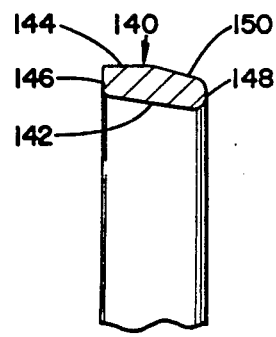
FIG. 15 shows the axial cross-sectional conformation of a seal ring used between a body and stem.

Inwardly extending portion 120 of slide D terminates in an axially extending projection 136 having an external circumferential groove 138 (FIG. 3) receiving a TFE seal ring 140. Slide D is part of body assembly A and may be considered a body part. the terminal end portion of slide D having groove 138 therein may be considered a body terminal end portion having a terminal end 141. Groove 138 has a groove bottom and axially-spaced groove sidewalls, including one groove sidewall closest to terminal end 141 and an opposite groove sidewall further therefrom. The groove bottom slopes outwardly away from axis 30 at a small angle in direction from the one groove sidewall toward the opposite groove sidewall. As best shown in FIG. 15, seal 140 has an inner surface 142 sloping at a shallow angle from axis 30 and an outer cylindrical portion 144. Parallel opposite ends 146,148 extend perpendicular to cylindrical surface 144. Approximately one-half of the width of seal 140 adjacent end 148 has an external sloping surface 150 sloping downwardly toward inner surface 142 at a shallow angle from axis 30. The bottom of cylindrical groove 138 is shaped to generally correspond with seal inner surface 142, while an inner surface portion 152 of stem member H is shaped to generally correspond with external surfaces 144,150 by having stem member cylindrical and sloping surfaces 153,155 (FIG. 4). The diameter of inner cylindrical surface 82 on slide D is substantially greater than the largest external diameter of seal 140. As a result, a pressure force differential will exist when the coupling is pressurized to normally bias slide D to the right in FIG. 2, and to more firmly engage and compress seal 140 between slide D and stem member H. A stem seal backup ring 156 is positioned between the left end of TFE seal 140 and the left end of groove 138 and, besides preventing extrusion of seal 140, it has the same or similar properties and material composition as packing backup ring 90.

Body valve E includes an external recess closely receiving a seal 160, with the surface of the recess corresponding in size and shape with the inner surface of the seal. Seal 160 has both external and internal surfaces which are sloped outwardly away from axis 30 in a direction proceeding away from slide D. This enhances the sealing action and allows the seal to conform with irregularities. An outer sloping surface 162 on seal 160 corresponds with a valve seat 164 on the interior of slide D adjacent the open end. Body valve E also includes a sloping stop surface 166 spaced axially and radially from seal 160 for cooperation with a corresponding sloping stop surface 168 adjacent the open end of slide D. This cooperation between the stop surfaces 166, 168 prevents damage or extrusion to seal 160 under high pressures. One end and an outer peripheral portion of seal 160 are surrounded by a metal retainer ring 170 for preventing blowout of seal 160 under high fluid pressure conditions. Metal retainer ring 170 is retained in position by a suitable snap ring 172 positioned in a suitable circumferential groove in body valve E. Body valve stop surface 166 is located on the opposite side of seal 160 from metal retainer ring 170 and stop surface 166 is located axially further away from slide D than retainer ring 170.

Poppet I includes an external recess shaped for closely receiving a poppet seal 180 having internal and external surfaces which are tapered outwardly from axis 30 in a direction away from the open end of stem member H. These internal and external tapering surfaces enable the seal to conform with irregularities on the mating surfaces. Seal 180 also has an outer sloping surface 182 for cooperation with a corresponding valve seat 184 adjacent the open inner end of stem member H. A tapering stop surface 189 on a metal retainer ring 187 is cooperative with a corresponding tapered stop surface 188 adjacent the open inner end of stem member H. Under normal circumstances, stop surfaces 189,188 will not engage one another, but will do so to prevent extreme deformation or extrusion of seal 180 under extremely high pressures. Retainer ring 187 surrounds an end and a peripheral portion of seal 180 to prevent seal blowout and is retained in position by a snap ring 190 received in a suitable groove in poppet I. Stop surface 189 and retainer ring 187 are located at the same end of seal 180, and retainer ring 187 is located axially closer to the open inner end of stem member H than is the portion of poppet I on the opposite side of seal 180 from retainer ring 187.

Figure 17:
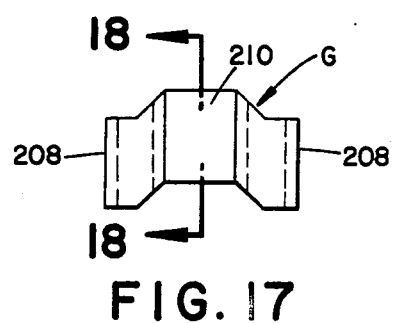
FIG. 17 is a top plan view taken generally along lines 17—17 of FIG. 16.
Figure 18:
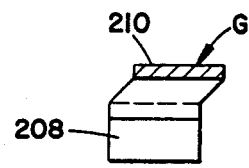
FIG. 18 is a cross-sectional view taken generlaly along lines 18—18 of FIG. 17.
Figure 16:
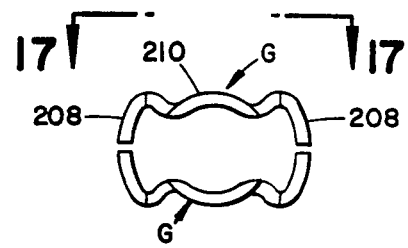
FIG. 16 is an end view showing fin members used to support a body valve bolt.

Bolt or elongated member F is secured to body valve E in a known manner and includes a pair of axially-spaced projections 202,204 between which a circumferential groove 206 is defined. Support fins G include a pair of fin members shown in detail in FIGS. 16-18. Each fin member is generally M-shaped in end view and includes a pair of main legs 208 connected by a generally U-shaped portion having a central curved portion 210 which is spaced from the terminal ends and is curved outwardly away therefrom. As best shown in FIGS. 17 and 18, curved central portion 210 is axially offset from main legs 208. When a pair of fin members are reversely positioned with the terminal ends of main legs 208 thereof engaging one another as shown in FIG. 16, the inner facing surfaces of curved central portions 210 lie on the periphery of a common circle having a diameter approximately the same as the diameter of the bottom of bolt groove 206. In addition, the distance between the opposite axial ends of curved central portion 210 is approximately the same as the distance between the inner facing surfaces of projections 202,204.

When a pair of fin members are reversely positioned in cooperative relationship around a bolt F as shown in FIG. 3, one end of legs 208 engages a circumferential shoulder 212 in the bore of body part C. A snap ring 214 received in a suitable circumferential groove retains support fins G in the desired position. As shown in FIG. 3, curved central portions 210 are axially offset from legs 208 in a direction away from body valve E. The shape and position of the fin members allows maximum flow through the bore of body part C while providing maximum strength for holding body valve E in position and resisting both sheer and compressive forces.

Figure 19:
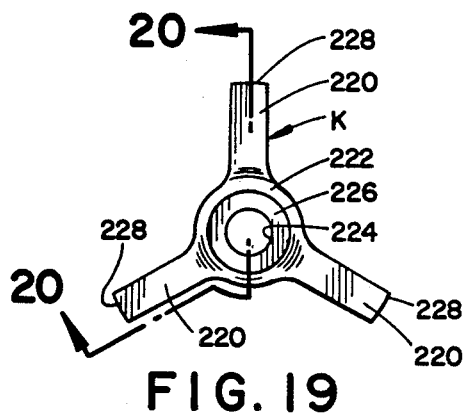
FIG. 19 is an end view showing a guide member for a poppet.
Figure 20:
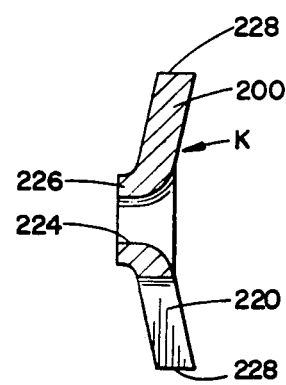
FIG. 20 is a cross-sectional view taken generally along lines 20—20 of FIG. 19.

As shown in FIGS. 19 and 20, poppet guide member K includes a plurality of radially extending circumferentially spaced apart spokes 220 issuing from a central area 222. A central opening 224 extends through the central area and is surrounded by a circular raised boss 226. The outer terminal ends 228 of spokes 220 are curved to lie on the periphery of a common circle and the spokes are equidistantly spaced from one another. As shown in FIG. 20, spokes 220 are inclined out of a flat plane in a direction opposite to the projecting direction of circular boss 226.

As shown in FIG. 4, poppet guide bolt J is surrounded by coil spring 14 and has a terminal end in the general shape of a truncated cone which abuts a corresponding conical bottom surface of a bore in poppet I. A shoulder 230 within a stem adapter 232 engages the outer end portions of spokes 220 on poppet guide K. A small diameter portion 234 of guide bolt J is closely received and slidably guided through hole 224. An enlarged portion of the guide bolt provides an abutment 236 for engaging the end of circular boss 226. One end of coil spring 14 is closely received over circular boss 226 and the other end thereof engages the back of an enlarged head on the terminal end portion of guide bolt J within the bore in poppet I for normally biasing the poppet to its closed position. The interior outer end portion of stem member H is suitably threaded for cooperation with external threads on stem adapter 232, and the interior of stem adapter 232 is threaded as indicated at 240 for connection to another fitting on a conduit. Here, too, interconnecting means of types other than threads 240 could be advantageously employed.

Figures 21, 22:
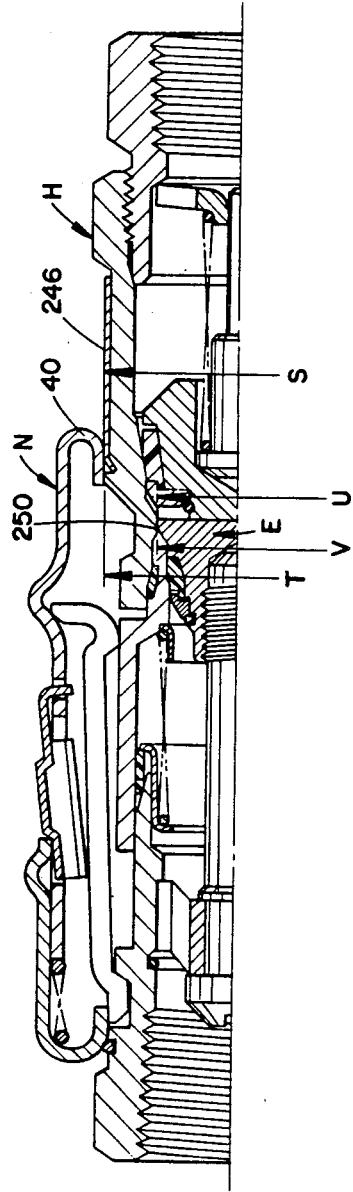
FIG. 21 is a partial cross-sectional view similar to FIG. 1 showing the various component diameters which are modified to provide keyed mating pairs of body and stem assemblies.
FIG. 22 is a table showing examples of various diameters in FIG. 21 which provide keyed mating pairs of body and stem assemblies.

With reference to FIGS. 21 and 22, the external diameter portion of stem member H which is received within operating sleeve N is varied by adding cylindrical shims 246 of various thicknesses thereto. Thus, the external diameter S of stem member H may be selectively varied. The inner diameter of reversely curved portion 40 of operating sleeve N is varied by machining the portion to variable desired internal diameters T. The largest external diameter portion of body valve E is varied by machining it to variable diameters V. The diameter of the smallest internal diameter portion 250 at the open inner end of stem member H is similarly varied by machining it to variable diameters U.

A plurality of pairs of mating body and stem assemblies are constructed and dimensioned such that the body assembly of one key will mate only with a stem assembly having the same key. Progressively larger keys have progressively larger external stem member diameters S, larger internal operating sleeve diameters T, larger body valve external diameters V, and larger stem open end internal diameters U. Thus, there is provided a coded system of couplings including a plurality of pairs of keyed mating body and stem assemblies A,B. Each body assembly includes an inner body valve E and an outer coupling sleeve defined by operating sleeve N. Each stem assembly has a stem member H with an external diameter S and an open stem end through which body valve E is received. Mating body and stem assemblies are dimensioned for close reception of stem member H within sleeve N and for close reception of body valve E within inner stem member end 250. With this arrangement, body and stem assemblies having different keys will not mate or connect due to interference either between a stem member H and a coupling sleeve N or between a body valve E and a stem inner end 250.

Examples of various diameters for a plurality of different keys is shown in FIG. 22. A stem assembly will not couple with the body of a higher key because of interference between valve body E and internal opening 250. A body assembly having a higher key will always have a larger external diameter on body valve E than the corresponding internal diameter at open end 250 of a smaller key stem assembly. A body assembly will not mate or connect with a stem assembly of a higher key because of interference between the external diameter of stem member H and the internal diameter of sleeve N. A stem assembly of a higher key will always have a larger external stem member diameter than the corresponding internal diameter of the sleeve on a smaller key body assembly.

FIGS. 23-33 illustrate a modified form of the invention. Generally, the construction and operation of the FIGS. 23-33 embodiment is the same as that previously described with reference to FIGS. 1-22. Consequently, the same reference characters have been used in the FIGS. 23-33 embodiment but differentiated from those of the FIGS. 1-22 embodiment by the addition of a prime (') suffix. The description of a corresponding element of the FIGS. 1-22 embodiment is to be taken as equally applicable to the FIGS. 23-33 embodiment unless otherwise noted.

In general, the FIGS. 23-33 embodiment incorporates certain modifications and improvements which serve to improve the overall functioning of the coupling assembly and/or to simplify its manufacture or assembly. Referring specifically to FIG. 23, the modified form of the coupling is shown in a longitudinal cross-sectional view with the body assembly A' coupled to the stem assembly B' in the manner discussed with reference to FIG. 2. One area of modification is with respect to the arrangement and construction of the leaf spring P'. In the FIG. 23 embodiment, the leaf spring P' comprises a simple, elongated flat spring having generally the configuration illustrated and extending from the right of circumferential bead 42' under the operating sleeve N' through the slot 52' and upwardly under the stop button O'. As can be appreciated, the leaf spring P' is positioned at a circumferential location intermediate the latch members L'. The left-hand end of leaf spring P' is configured to closely conform to the shape of the lower surface of the stop button O'. The spring P' is prevented from shifting laterally or twisting because of the portion captured in slot 52' beneath the stop button O'. This arrangement eliminates the need for the full circumferential spring described with reference to the FIGS. 1–22 embodiment. In order to accommodate the spring beneath the stop button O' the right-hand end configuration of stop button O' is changed slightly to increase the available space between the stop button and the underlying portion of operating sleeve N'.

Figure 32:
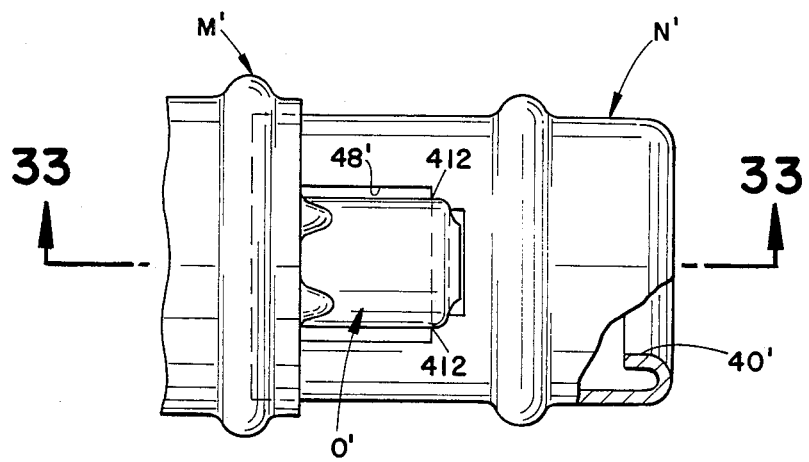
FIG. 32 is a view taken on line 32—32 of FIG. 23.
Figure 33:
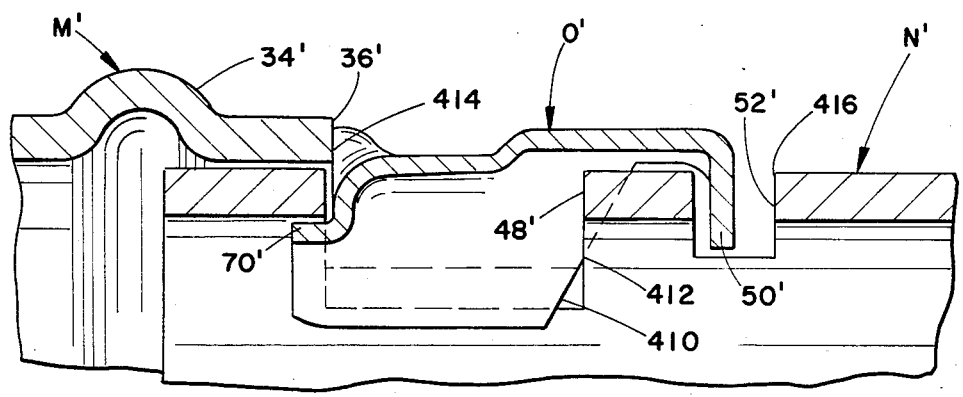
FIG. 33 is a view taken on line 33—33 of FIG. 32.

With further respect to stop button O', FIGS. 32 and 33 illustrate in some detail, relationships between stop button O', operating sleeve N' and abutment sleeve M' which have been found to be important to the functioning of the coupling. In the FIGS. 32 and 33 showing, the spring P' has been omitted to show certain relationships more clearly.

To understand the relationships, a review of the button O' and its associated components is desirable. As shown in FIGS. 32 and 33, leg 50' extends inwardly through slot 52' and the outwardly extending flanges 70' are received under the edges of rectangular opening 48'. Preferably, the laterally spaced right-hand edges 410 of button O' are inclined as shown in FIG. 33 and engage the right-hand edge of rectangulr opening 48' at points 412 (see FIGS. 32). The points 412 thus serve as the pivots for the arcuate movement of button O' when it is moved to its unlatch or release position. The load point for the button O' is, of course, the point of engagement 414 between the abutment edge 36' and the button O'.

The uncouple the coupling, force components must rotate button O' inwardly to its release position. Force components must also move operating sleeve N' axially into abutment sleeve M' until recess 44' is located axially outwardly of latch projection 24' (see FIG. 23). Under certain conditions, a blow to the coupling could generate both of these force components. The preferred arrangement and configuration shown in FIG. 33 and described above significantly reduces the possibility that such a blow will produce uncoupling.

In particular, when operating sleeve N' moves into abutment sleeve M' before button O' reaches its inward release position, the movement of operating sleeve N' into abutment sleeve M' produces a pair of opposing forces at points 414 and 412. These forces are parallel to axis 33'. They create a force couple which tends to rotate button O' outwardly away from its release position. This outward rotation opposes any subsequent or simultaneous force component working to rotate O' inwardly. The releasing acton is thus forced to be somewhat sequential with button O' requiring depression prior to significant axial movement of operating sleeve N' into abutment sleeve M'. This tendency toward requiring sequential operation significantly reduces the possibility of an external blow producing inadvertent uncoupling.

In view of the above, it is preferred that button O' pivot about a point such as point 412 which is substantially radially inward from reaction point 414. This radially inward displacement increases the movement between the couple of parallel axial forces acting at points 414 and 412. This increased movement increases the outward rotation of button O'. The same action would be present to a lesser extent in an embodiment where button O' pivots about point 416.

A relatively significant change in the overall operation and construction of the coupling is with respect to the construction and operation of the latch members L'. It was found that under certain conditions of operation of the FIGS. 1–22 embodiment the latch hooks 22' of the latch member L' could move radially inwardly even though the stem H' was not properly received on terminal end 141'. For example, if the stem H' was tilted out of proper alignment with the body assembly A' when a connection was attempted, it was possible to move slide D' away from body valve E' even though stem part H' was not mated with the end of slide D'. Under such conditions one or more of the latch members L' could move radially inwardly and hook or trap the slide D' in its open position without engaging the circumferential groove 60' on stem part H'. The FIGS. 23–31 embodiment overcomes this possible problem by providing a radially inwardly extending protrusion 260 on the inner surface of the latch members L'. As shown in FIGS. 23–26, the protrusion 260 is arranged to extend to approximately the same innermost position as the latch hook portion 22'. In addition, the protrusion 260 has an engagement surface 262 which is spaced longitudinally from an engagement surface 264 on hook 22'. The spacing between surfaces 262 and 264 is only slightly greater than the width of the outer surface portion 62' of stem part H'. In addition, the right-hand end of slide member D' is tapered or inclined as shown at 266.

Figure 24:
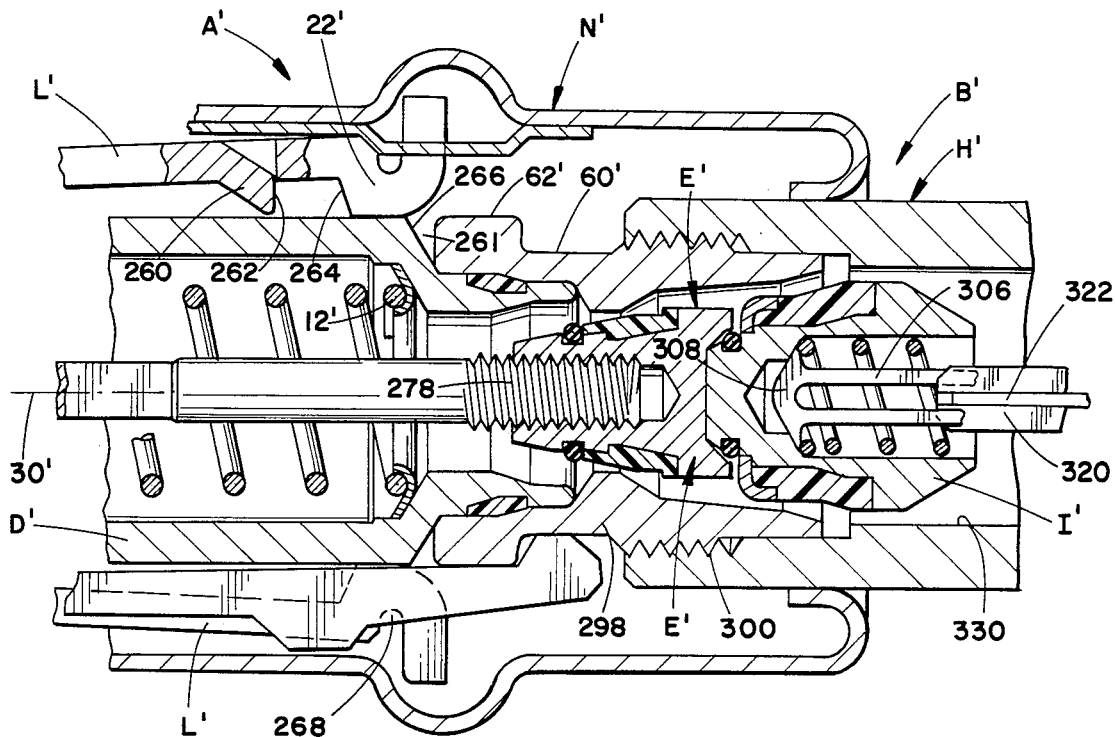
FIG. 24 is a partial cross-sectional view of the coupling of FIG. 23 but showing the body and stem coupling assemblies as they are in the process of being connected.
Figure 25:
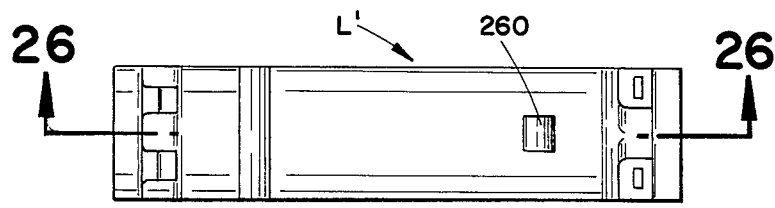
FIG. 25 is a plan view of the latch member used in FIG. 23 coupling.
Figure 27:
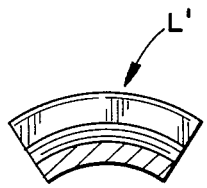
FIGS. 26 and 27 are cross-sectional views taken on lines 26—26 and 27—27, respectively, of FIG. 25.
Figure 26:
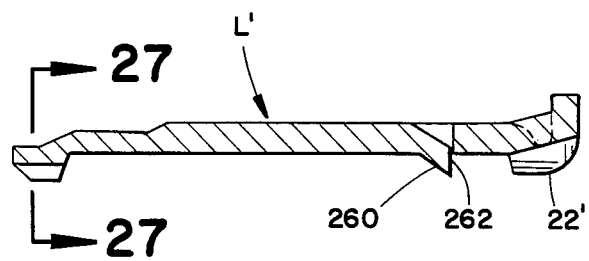
Figure 28:
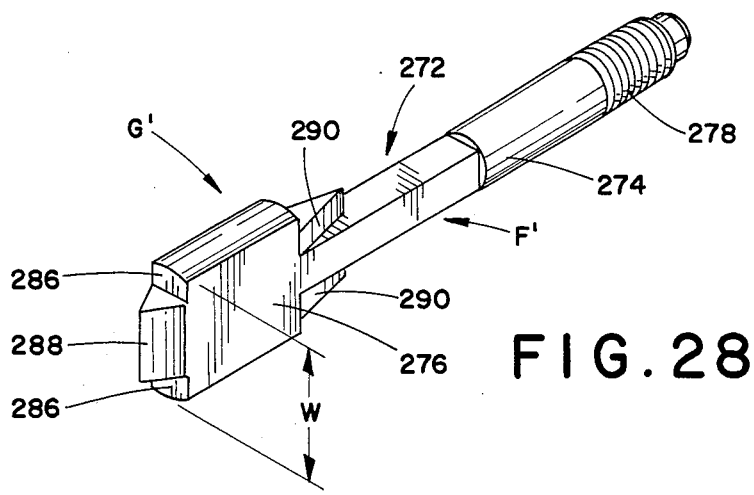
FIG. 28 is a perspective view of the body bolt used in the coupling of FIG. 23.

FIG. 24 shows the effect of the protrusion 260 and the tapered portion 266 described above. Note that as the stem portion H' enters the body assembly A' it begins moving slide D' to the left or open position. During movement of slide D' to its open position, the protrusions 260 ride on the outer cylindrical surface of the slide D' and prevent the latch hooks 22' from moving inwardly until the inclined surface 266 passes under protrusion 260. As the slide D' moves to its full open position, the latch hooks can move inwardly and enter circumferential groove 60'. Simultaneously, the protrusions 260 move inwardly and enter the space 261 between the ends of stem part H' and the inclined surface 266. It should be appreciated that the distance which the slide member D' must be moved inwardly before latch engagement can take place is significantly greater than any movement which can be produced by misalignment of the stem part H' with the end opening in the operating sleeve N'. Consequently, the arrangement prevents any possibility of inadvertently latching the slide D' in its open position without proper mating with stem part H'.

In the embodiment under consideration, the slide D' includes a pair of latches or fingers 268 (only one is illustrated in FIG. 23) which are positioned approximately 180° apart circumferentially of the slide D' and out of alignment with the latch members L'. These fingers 268 are arranged to engage in the circumferential groove 60' of stem part H' when the components A' and B' are in their coupled relationship. When the components are separated, however, the fingers 268 remain engaged as the coupled components are separated and thus pull the slide D' to its outer closed position. The fingers 268 form no part of the subject invention and their construction and operation is more fully described in commonly assigned co-pending application Ser. No. 583,747, filed Feb. 27, 1984. The disclosure of application Ser. No. 583,747 is incorporated herein by reference.

In the FIGS. 23-31 embodiment, the previously discussed bolt or elongated member F which positions and supports body valve E has been greatly simplified and made unitary with the support fins G. As best shown in FIG. 23 and particularly FIG. 28, the bolt section F' and the support fin section G' are combined into a single unitary element or member 272 which includes an elongated body portion 274 and a support end portion 276. The outer end of elongated body portion 274 is threaded as shown at 278 to receive the body valve member E'. The support end portion 276 has a width W to allow it to be closely received in the bore 280 in body part C'. Bore 280 includes a radially inwardly extending shoulder 282 which can engage end surfaces 286 of support end 276 to limit the leftward movement of member 272 (as viewed in FIG. 23). The thickness of support end 276 is slightly less than the diameter of the elongated body 274 and has integrally formed tapered portions 288 and 290 arranged to improve the flow characteristics of fluid passing the support end 276.

The member 272 is locked or fixed in position in the bore 280 by the cooperation of the inwardly extending shoulder 282 and inwardly extending protrusions 294 and 296 (see FIG. 29). Protrusions 294 and 296 are preferably provided by upsetting or swaging the outer cylindrical surface 81' of body part C' radially inwardly. Note that protrusions 296 are positioned circumferentially adjacent the lateral sides of support body 276 and the protrusions 294 are positioned adjacent the end, as shown in FIG. 23. This arrangement locks the member 272 in position against movement both axially and circumferentially of the bore 280 and assures that body valve E' is maintained in the proper relationship with the body part C'.

Figure 30:
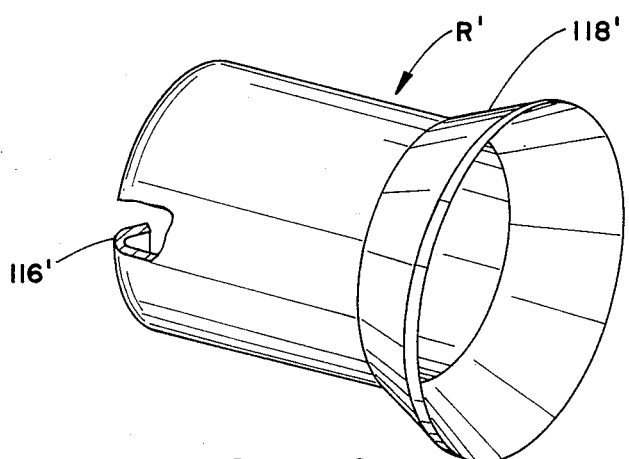
FIG. 30 is a perspective view of the packing gland used in the FIG. 23 coupling.

A further modification present in the FIGS. 23-31 embodiment is present with respect to the cup like packing gland R'. This modification is best illustrated in FIGS. 23 and 30. As shown therein, the radially extending flange 118' is bent so that it does not extend perpendicular to the longitudinal axis 30'. Rather, it extends at an angle somewhere in the range of 30° to 45° relative to the axis. As is apparent from FIG. 23, this allows packing gland R' to apply both radial and axial components of force to the packing ring 92'. This has the effect of improving the fluid sealing characteristics of the packing ring to prevent foreign matter from entering the space between the packing and the bore and thereby maintain the components clean.

The embodiment of FIGS. 23-31 also presents some changes in the stem assembly B'. Specifically, stem assembly B' has been modified by making the stem adapter 232' an integral part of stem part H'. Stem part H' is, however, formed such that the portion forming outer end portion 62' and circumferential groove 60' is separable from the main body at a threaded connection 300. Portion 298 is internally configured to provide the poppet valve seat portions 188' and 184' discussed earlier.

Figure 31:
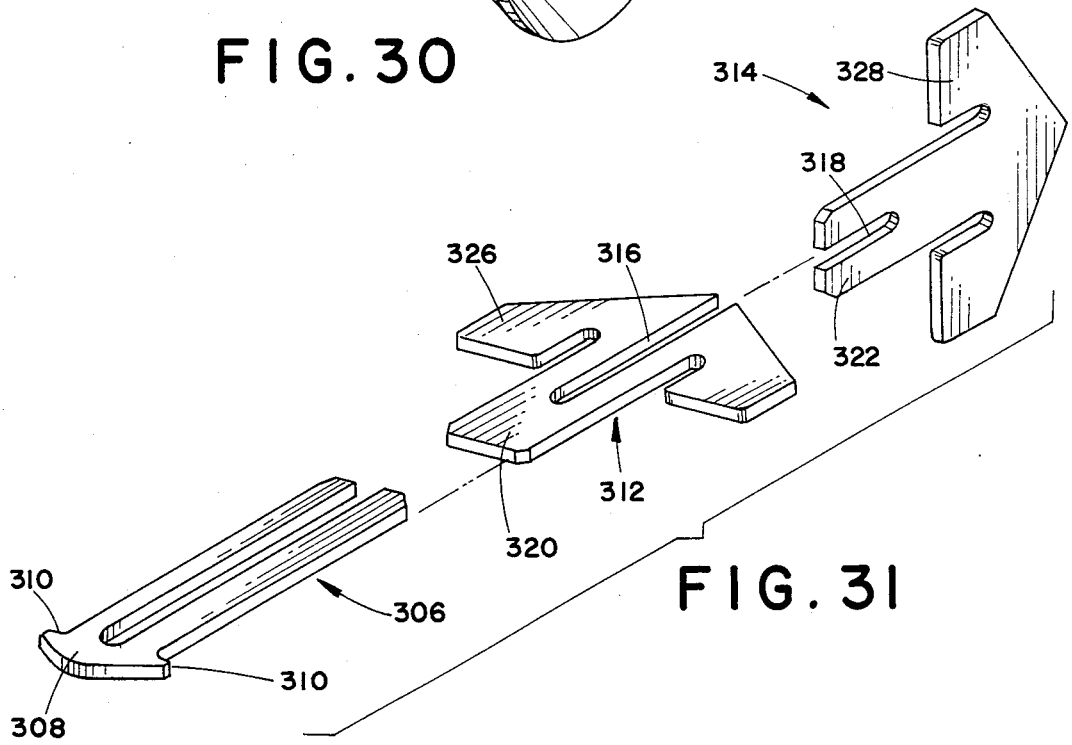
FIG. 31 is an exploded, perspective view of the poppet and spring guide assembly of the FIG. 23 coupling.

In addition to the modifications noted above, the previously discussed guide shaft J and the guide member K, shown in the FIGS. 1-22 embodiment, are replaced by a support and guide assembly, best shown in FIGS. 23 and 31. As shown, the poppet valve I' is supported and guided by a first, elongated generally U-shaped member 306 having a head portion 308 adapted to be received in the inwardly extending bore in poppet valve member I'. The spring 14' is closely received about the member 306 and engages the outwardly extending tabs 310 of the member 306. Member 306 is guided and supported by a support member which has a generally X-shaped in planes perpendicular to its longitudinal axis. It is defined by a pair of planar bodies 312 and 314 having the configuration best shown in FIG. 31. Bodies 312 and 314 are arranged to be interfitted by cooperating, axially extending slots 316 and 318, respectively. The central portions 320 and 322 of members 312 and 314 have a width which is no greater than the internal open diameter of spring 14'. The maximum width across the lateral sections 326 and 328 of members 312 and 314 are sized to be only slightly smaller than the diameter of bore 330 in stem part H'. As shown, the right-hand ends of parts 312 and 314 (as viewed in FIG. 31) are tapered or inclined and seat against a correspondingly tapered or inclined circumferential shoulder 332 formed in bore 330.

With the components assembled as shown in FIG. 23, the spring 14' maintains the member 306 and poppet I' under a constant bias toward the left or closed position shown in FIG. 23. The use of the modified poppet guide and support arrangement increases the available flow area and simplifies the manufacturing of the valve.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is now claimed:

1. A seal between cooperating inner and outer fluid coupling parts having a common longitudinal axis and respectively including closely facing outer and inner surfaces extending generally parallel to said axis, said inner part having a terminal inner end spaced radially inward from said outer surface thereof, said inner part including an external slow taper surface extending therealong from said terminal inner end in a direction outwardly toward said outer surface thereof to define a packing receiving space between said slow taper surface and a portion of said inner surface on said outer part, and deformable packing ring shaped and sized for close reception in said packing receiving space and having inner and outer packing ring surface portions respectively shaped to generally correspond and cooperate with said slow taper surface and said inner surface of said outer part, and biasing means including a packing gland member guided centrally within said inner coupling part and having a radially outward extending flange for engaging said packing ring and biasing said packing ring into said packing receiving space.

2. The seal as defined in claim 1 wherein said slow taper surface turns sharply outward adjacent the intersection thereof with said outer surface of said inner part to define an apex portion of said packing receiving space, and a backup ring separate from said packing ring positioned in said packing receiving space at said apex portion to prevent extrusion of said packing ring between said facing surfaces of said inner and outer parts at said apex portion.

3. The seal as defined in claim 2 wherein said backup ring is constructed of a less deformable material than said packing ring.

4. The seal as defined in claim 3 wherein said packing ring is comprised of TFE and said backup ring is comprised of TFE plus a harder filler material.

5. A seal between cooperating inner and outer fluid coupling parts having a common longitudinal axis and respectively including closely facing outer and inner surfaces extending generally parallel to said axis, said inner part having a terminal inner end spaced radially inward from said outer surface thereof, said inner part including an external slow taper surface extending therealong from said terminal inner end in a direction outwardly toward said outer surface thereof to define a packing receiving space between said slow taper surface and a portion of said inner surface on said outer part, a deformable packing ring shaped and sized for close reception in said packing receiving space and having inner and outer packing ring surface portions respectively shaped to generally correspond and cooperate with said slow taper surface and said inner surface of said outer part, and a cup-like packing gland partially received in said inner part at said inner end thereof, said gland having an inwardly extending flange inside of said inner part and an outwardly extending flange outside of said inner part, and spring means engaging said inwardly extending flange and biasing said gland in a direction for engaging said outwardly extending flange with said packing and urging same into said packing receiving space.

6. The seal as defined in claim 5 wherein said outwardly extending flange on said gland is inclined at an angle to apply both axially and radially outwardly directed force components to said packing.

7. The seal as defined in claim 6 wherein said outwardly extending flange on said gland extends outwardly to a point closely adjacent said inner surface on said outer coupling part.

8. A seal between cooperating inner and outer fluid coupling parts having a common longitudinal axis and respectively including closely facing outer and inner surfaces extending generally parallel to said axis, said inner part having a terminal inner end spaced radially inward from said outer surface thereof and including an external taper surface extending therealong from said terminal inner end in a direction outwardly toward said outer surface thereof to define a packing receiving space between said taper surface and a portion of said inner surface on said outer part, said taper surface including a slow taper surface portion extending from said terminal inner end toward said outer surface of said inner part and turning sharply outwardly at a short fast taper surface portion adjacent the intersection thereof with said outer surface of said inner part to define an apex portion of said packing receiving space, a deformable packing ring received in said packing receiving space, a deformable backup ring of harder material than said packing ring positioned in said packing receiving space at said apex portion thereof between said packing ring and said fast taper surface portion, biasing means for biasing said packing ring into said packing receiving space, said packing ring including an outer end portion extending axially beyond said terminal inner end of said inner coupling part, and said biasing means including a packing gland guided within said inner coupling part and carrying a spring centrally therein, said packing gland having a radially extending flange engaging said outer end portion of said packing gland.

9. A seal between inner and outer fluid coupling parts respectively having closely facing cooperating outer and inner surfaces, said inner part having a terminal inner end spaced radially inwardly from said outer surface thereof and including an external taper surface extending therealong from said inner end outwardly toward said outer surface thereof to define a packing receiving space, a packing ring received in said packing receiving space, a packing gland partially received in said inner part at said inner end thereof and having an inwardly extending flange inside of said inner part and an outwardly extending flange outside of said inner part, and biasing means acting on said inwardly extending flange for biasing said gland in a direction for engaging said outwardly extending flange with said packing and urging same into said packing receiving space.

10. The seal as defined in claim 9 wherein said biasing means comprises a coil spring having one end engaging said inwardly extending flange and an opposite end engaging said outer part.

11. The seal as defined in claim 9 wherein said gland is slidably guided for axial movement inside of said inner part.

12. The seal as defined in claim 9 wherein said inner and outer coupling parts respectively define a body and slide, said slide being axially movable in one direction further onto said body and in an opposite direction off from said body, said biasing means also acting on said slide for normally biasing same in said opposite direction, and means for preventing complete displacement of said slide from said body.

13. The seal as defined in claim 9 wherein said outwardly extending flange is configured to urge said packing radially while urging same into said packing receiving space.

14. The seal as defined in claim 11 wherein said outwardly extending flange is inclined at an angle to apply both axial and radially outwardly directed force components to said packing.

15. A seal between cooperating inner and outer fluid coupling parts having a common longitudinal axis and respectively including closely facing outer and inner surfaces extending generally parallel to said axis, said inner part having a terminal inner end spaced radially inward from said outer surface thereof and including an external taper surface extending therealong from said terminal inner end in a direction outwardly toward said outer surface thereof to define a packing receiving space between said taper surface and a portion of said inner surface on said outer part, said taper surface including a slow taper surface portion extending from said terminal inner end toward said outer surface of said inner part and turning sharply outwardly at a short fast taper surface portion adjacent the intersection thereof with said outer surface of said inner part to define an apex portion of said packing receiving space, a deformable packing ring received in said packing receiving space, a deformable backup ring of harder material than said packing ring positioned in said packing receiving space at said apex portion thereof between said packing ring and said fast taper surface portion, biasing means for biasing said packing ring into said packing receiving space, said packing ring having inner and outer surface portions respectively shaped to generally correspond and cooperate with said slow taper surface portion and said inner surface of said outer part, and said packing ring extending axially beyond said terminal inner end of said inner part in a direction away from said inner part and terminating at a packing ring end, and said biasing means being in engagement with said packing ring end.

* * * * *